US010346933B2

(12) United States Patent
Maasoumy et al.

(10) Patent No.: US 10,346,933 B2
(45) Date of Patent: Jul. 9, 2019

(54) SYSTEMS AND METHODS FOR REGRESSION-BASED DETERMINATION OF EXPECTED ENERGY CONSUMPTION AND EFFICIENT ENERGY CONSUMPTION

(71) Applicant: C3 IoT, Inc., Redwood City, CA (US)

(72) Inventors: Mehdi Maasoumy, Redwood City, CA (US); Zico Kolter, Pittsburgh, PA (US); Henrik Ohlsson, San Francisco, CA (US)

(73) Assignee: C3 IoT, Inc., Redwood City, CA (US)

( * ) Notice: Subject to any disclaimer, the term of this patent is extended or adjusted under 35 U.S.C. 154(b) by 398 days.

(21) Appl. No.: 14/621,228

(22) Filed: Feb. 12, 2015

(65) Prior Publication Data
US 2016/0238640 A1 Aug. 18, 2016

(51) Int. Cl.
*G01R 21/00* (2006.01)
*G06G 7/48* (2006.01)
*G06F 19/00* (2018.01)
*G21C 17/00* (2006.01)
*G06Q 50/06* (2012.01)
*G06Q 10/06* (2012.01)

(52) U.S. Cl.
CPC ............ *G06Q 50/06* (2013.01); *G06Q 10/06* (2013.01); *Y02D 10/45* (2018.01)

(58) Field of Classification Search
CPC .................. G06F 1/26; G06Q 50/06
See application file for complete search history.

(56) References Cited

U.S. PATENT DOCUMENTS

| 8,738,334 B2 * | 5/2014 | Jiang ..................... G06Q 10/04 703/2 |
| 2010/0070217 A1 * | 3/2010 | Shimada ................ G01D 4/008 702/62 |
| 2011/0046792 A1 * | 2/2011 | Imes ....................... F24F 11/63 700/278 |

(Continued)

FOREIGN PATENT DOCUMENTS

WO   WO-2016130934 A1   8/2016

OTHER PUBLICATIONS

EP16749971.4 Extended European Search Report dated Sep. 21, 2018.

(Continued)

*Primary Examiner* — Moazzam Hossain
(74) *Attorney, Agent, or Firm* — Wilson, Sonsini, Goodrich & Rosati

(57) ABSTRACT

Various embodiments of the present disclosure can include systems, methods, and non-transitory computer readable media configured to identify a set of features associated with at least one of a collection of residences or an energy billing period. Measured energy consumption information and a plurality of feature values can be acquired for each residence in the collection of residences. Each feature value in the plurality of feature values can correspond to a respective feature in the set of features. A regression model can be trained based on the measured energy consumption information and the plurality of features values for each residence in the collection of residences. At least one expected consumption value and at least one efficient consumption value can be determined based on the regression model.

31 Claims, 13 Drawing Sheets

(56) References Cited

U.S. PATENT DOCUMENTS

| | | | | |
|---|---|---|---|---|
| 2011/0251933 A1* | 10/2011 | Egnor | ............... | G06Q 50/06 |
| | | | | 705/30 |
| 2011/0257911 A1* | 10/2011 | Drees | ............... | G05B 15/02 |
| | | | | 702/61 |
| 2012/0130924 A1* | 5/2012 | James | ............... | G01W 1/10 |
| | | | | 705/412 |
| 2012/0278051 A1 | 11/2012 | Jiang et al. | | |
| 2013/0289788 A1* | 10/2013 | Gupta | ............... | G05B 13/02 |
| | | | | 700/291 |
| 2014/0330611 A1* | 11/2014 | Steven | ........... | G06Q 10/06314 |
| | | | | 705/7.24 |
| 2015/0012147 A1* | 1/2015 | Haghighat-Kashani | ................ | |
| | | | | G06Q 30/02 |
| | | | | 700/291 |
| 2015/0169795 A1* | 6/2015 | ElBsat | ............ | G06F 17/5009 |
| | | | | 703/2 |
| 2015/0248118 A1* | 9/2015 | Li | ............ | G05B 13/04 |
| | | | | 700/295 |

OTHER PUBLICATIONS

PCT/US2016/017778 International Search Report and Written Opinion dated Jul. 14, 2016.

* cited by examiner

| | Feature 1: Home Age (years) | Feature 2: Area (sq. ft.) | Feature 3: Air Conditioning (1=yes, 0=no) | ... | Feature k: HDD | Regression Parameters | | Measured Consumption (kWh) |
|---|---|---|---|---|---|---|---|---|
| Home 1 | 10 | 1667 | 1 | ... | 23 | $\theta_1$ | | 44 |
| Home 2 | 24 | 1524 | 0 | ... | 17 | $\theta_2$ | | 37 |
| Home 3 | 17 | 831 | 1 | ... | 24 | $\theta_3$ | = | 26 |
| ⋮ | ⋮ | ⋮ | ⋮ | ⋱ | ⋮ | ⋮ | | ⋮ |
| Home N | 6 | 1284 | 1 | ... | 27 | $\theta_k$ | | 31 |

410 (features matrix), 430 (regression parameters), 420 (measured consumption), 400

Expected Consumption Value (kWh)

Transpose of Parameter Vector

Feature Vector $y_{exp\,i} = \begin{bmatrix} \theta_1 & \theta_2 & \theta_3 & \cdots & \theta_k \end{bmatrix} \begin{bmatrix} 12 \\ 667 \\ 1 \\ \vdots \\ 19 \end{bmatrix}$ Feature 1
Feature 2
Feature 3
⋮
Feature k

SYSTEMS AND METHODS FOR REGRESSION-BASED DETERMINATION OF EXPECTED ENERGY CONSUMPTION AND EFFICIENT ENERGY CONSUMPTION

FIELD OF THE INVENTION

The present technology relates to the field of energy management. More particularly, the present technology provides techniques for regression-based determination of expected energy consumption and efficient energy consumption.

BACKGROUND

Resource consumption touches every aspect of life. Resources are consumed for a wide variety of purposes every day. In some cases, energy is consumed in order to provide power to various components or to enable various devices or systems to function. In one example, energy in the form of electricity is consumed to enable the operations of computing devices or computing systems, appliances, air-conditioners, and many other components, entities, devices, or systems. In another example, energy in the form of gas is consumed to enable gas space heaters, gas water heaters, gas stoves, and other components, entities, devices, or systems to function.

Due to significant amounts of energy being consumed every day, it can be beneficial to provide tools or services for observing, tracking, and evaluating energy consumption. Conventional approaches to observing, tracking, and evaluating energy consumption may not adequately take into consideration where the energy consumption occurs. Moreover, conventional approaches to energy consumption observation, tracking, and evaluation may not provide useful and realistic results. Accordingly, these conventional approaches are often times inaccurate, impractical, inefficient, or costly. Such concerns can create challenges for and worsen/deteriorate the overall experience associated with energy consumption.

SUMMARY

Various embodiments of the present disclosure can include systems, methods, and non-transitory computer readable media that are configured to identify a set of features associated with at least one of a collection of residences or an energy billing period. Measured energy consumption information and a plurality of feature values can be acquired for each residence in the collection of residences. Each feature value in the plurality of feature values can correspond to a respective feature in the set of features. For example, each feature in the identified set of features can have a corresponding feature value, which can be included in the plurality of feature values. A regression model can be trained based on the measured energy consumption information and the plurality of features values for each residence in the collection of residences. At least one expected consumption value and at least one efficient consumption value can be determined based on the regression model.

In an embodiment, a request to determine energy consumption values for a query residence can be received. At least some feature values for the query residence can be acquired.

In an embodiment, the determining of the at least one expected consumption value and the at least one efficient consumption value can further comprise determining an expected consumption value for the query residence based on the regression model and the at least some feature values for the query residence. An efficient consumption value for the query residence can be determined based on the expected consumption value for the query residence.

In an embodiment, the expected consumption value for the query residence and the efficient consumption value for the query residence can be presented to an entity that is associated with the request.

In an embodiment, a measured consumption value for the query residence can be presented to the entity that is associated with the request.

In an embodiment, the identifying of the set of features associated with at least one of the collection of residences or the energy billing period can further comprise identifying a first subset of features and a second subset of features from the set of features. The first subset of features can be associated with the collection of residences and the second subset of features can be associated with the energy billing period.

In an embodiment, the acquiring of the measured energy consumption information and the plurality of feature values can further comprise acquiring, for each residence, a measured consumption value. A first group of feature values can be acquired for each residence. Each feature value in the first group of feature values can correspond to a respective feature in the first subset of features. A second group of feature values can be acquired for the energy billing period. Each feature value in the second group of feature values can correspond to a respective feature in the second subset of features. The plurality of feature values can include the first group of feature values and the second group of feature values.

In an embodiment, the second subset of features can include at least one of a heating degree days (HDD) feature, a cooling degree days (CDD) feature, or a feature that indicates an energy billing period portion.

In an embodiment, the first subset of features can include at least one (e.g., all) of a residence age feature, a residence location feature, a residence area metric feature, a room quantity feature, a building type feature, a cooling system feature, a water heating feature, a space heating feature, an occupancy quantity feature, an appliance quantity feature, or a living situation feature. In some cases, the living situation feature can describe or indicate whether a resident owns or rents a particular residence.

In an embodiment, the building type feature can be associated with at least one of a single family home indication, a large apartment indication, a small apartment indication, or a mobile home indication. The cooling system feature can be associated with at least one of an air conditioning indication, a window indication, or a cooling system absence indication. The water heating feature can be associated with at least one of a water heating electricity indication, a water heating natural gas indication, or a water heating miscellaneous indication. The space heating feature can be associated with at least one of a space heating electricity indication, a space heating natural gas indication, a fuel oil indication, or a space heating absence indication.

In an embodiment, the collection of residences can include one or more residences for which information, including the plurality of feature values, is available.

In an embodiment, at least some of the plurality of features values can be acquired based on one or more Bayesian inference processes.

In an embodiment, the training of the regression model can further comprise inputting the plurality of feature values for each residence into a respective row, out of a set of rows, within a feature matrix. The measured energy consumption information for each residence can be inputted into a respective row, out of the set of rows, within an output vector. One or more parameters within a parameter vector for the regression model can be determined based on the feature matrix and the output vector.

In an embodiment, the feature matrix can be represented by X, the output vector can be represented by y, the parameter vector can be represented by θ, and y can equal Xθ.

In an embodiment, the determining of the one or more parameters within the parameter vector can be based on $\theta = (X^T X)^{-1} X^T y$.

In an embodiment, the determining, of the at least one expected consumption value and the at least one efficient consumption value can include determining an expected consumption value for a query residence and an efficient consumption value for the query residence. The expected consumption value for the query residence can be determined based on $y_{exp\ i} \approx \theta^T x_i$. The expected consumption value for the query residence can be represented by $y_{exp\ i}$ and $x_i$ can represent a feature vector including at least some (e.g., all) feature values for the query residence.

In an embodiment, the efficient consumption value for the query residence can be determined based on $y_{eff\ i} = y_{exp\ i} - S.E.$ The efficient consumption value for the query residence can be represented by $y_{eff\ i}$ and S.E. can represent a standard error.

In an embodiment, the standard error can be determined based on $$S.E. = \sqrt{\frac{(y - X\theta)^2}{N - m}}.$$

N can represent a quantity of rows in the set of rows within the feature matrix and m can represent a number of features.

Many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4A illustrates an example representation of data associated with regression-based determination of expected energy consumption and efficient energy consumption, in accordance with an embodiment of the present disclosure.

FIG. 4B illustrates an example representation of data associated with regression-based determination of expected energy consumption, in accordance with an embodiment of the present disclosure.

Figure 1:
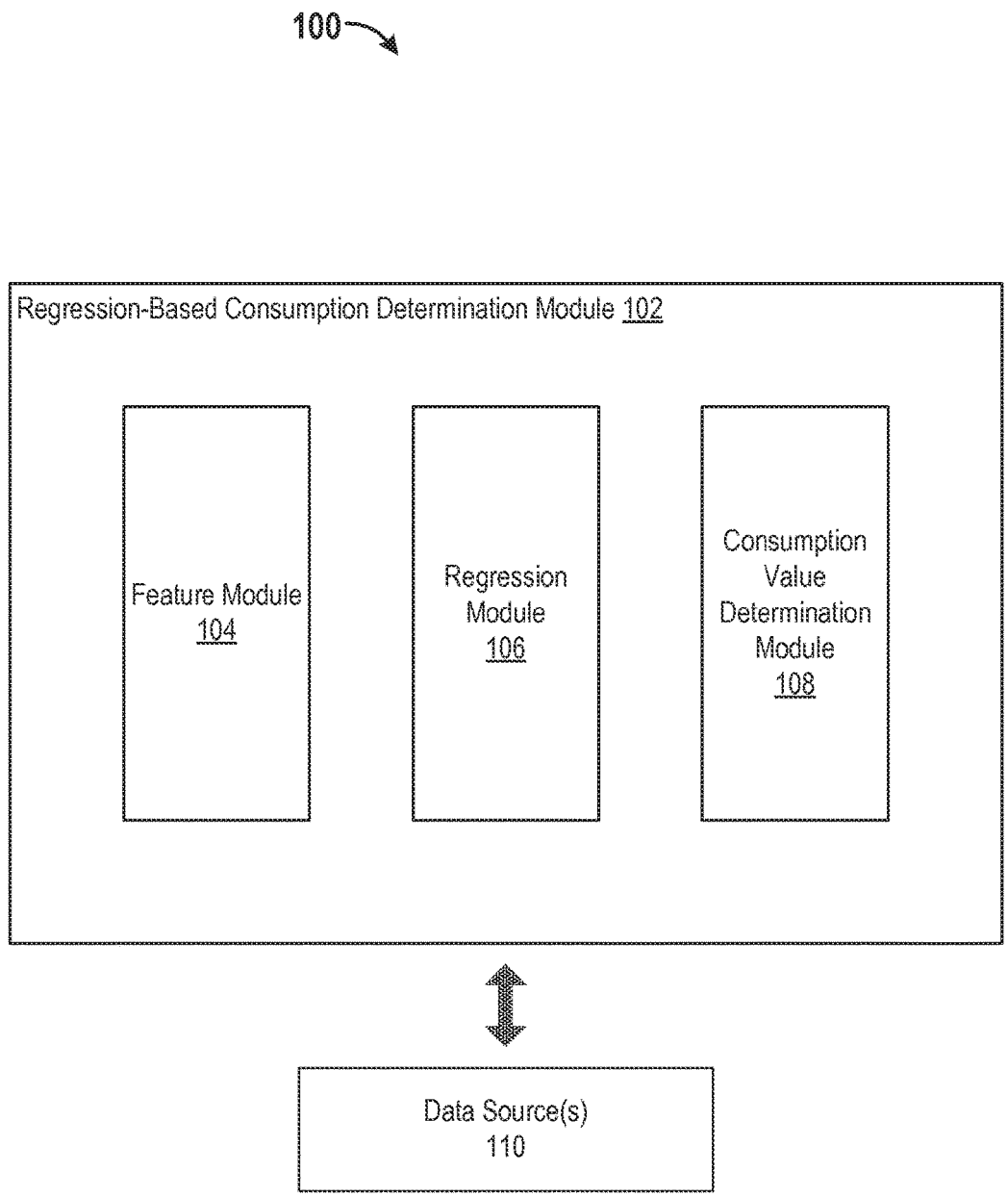
FIG. 1 illustrates an example system including an example regression-based consumption determination module configured to facilitate regression-based determination of expected energy consumption and efficient energy consumption, in accordance with an embodiment of the present disclosure.

The figures depict various embodiments of the present disclosure for purposes of illustration only, wherein the figures use like reference numerals to identify like elements. One skilled in the art will readily recognize from the following discussion that alternative embodiments of the structures and methods illustrated in the figures may be employed without departing from the principles of the disclosed technology described herein.

DETAILED DESCRIPTION

Regression-Based Determination of Expected Energy Consumption and Efficient Energy Consumption Resources, such as energy, are consumed or used every day for a wide variety of purposes. In one example, consumers can use energy in the form of gas to power various appliances at home and businesses can use gas to operate various machinery. In another example, consumers and businesses can use energy in the form of electricity to power various electronic appliances and other electrical components, devices, or systems.

Energy consumption is facilitated by energy providers who supply energy to meet demand. Energy providers, such as utility companies, can provide one or more forms of energy, such as gas and electricity. Energy providers can utilize energy distribution systems to provide or deliver energy to their intended customers (i.e., users). In exchange, energy providers can bill their customers for the amount of energy consumed. Customers have to pay their energy bills if they wish to continue using the provided energy.

In some cases, the customers (i.e., users) may desire to observe, track, evaluate, or otherwise manage their energy consumption. In one example, a residential customer may desire to know how energy is being consumed at his or her residence, such that the customer can attempt to reduce the amount of energy consumed at his or her residence and thus reduce his or her energy bills or costs. Under conventional approaches, energy management tools (or services) can be provided to the customer such that the customer can attempt to evaluate or assess the energy consumption at his or her residence. However, such conventional energy management tools (or services) may not take into account properties, characteristics, and other information particular to the customer's residence. Accordingly, such conventional approaches may not enable the customer to accurately or realistically evaluate the energy consumption at his or her residence. Moreover, conventional approaches can require special or proprietary sensors, hardware, and other equipment to be installed for the customers, which can be time-consuming, labor intensive (e.g., installation, repair, maintenance, etc.), and expensive. Due to these and other reasons, conventional approaches can be inaccurate, problematic, and inefficient. Accordingly, an improved approach for providing energy consumption evaluation or management can be advantageous.

Various embodiments of the present disclosure can provide regression-based determination of expected energy consumption and efficient energy consumption. Systems, methods, and non-transitory computer readable media of the disclosed technology can be configured to identify a set of features associated with at least one of a collection of residences or an energy billing period. Measured energy consumption information and a plurality of feature values can be acquired for each residence in the collection of residences. Each feature value in the plurality of feature values can correspond to a respective feature in the set of features. A regression model can be trained based on (e.g., based entirely on, based in part on, based at least in part on, etc.) the measured energy consumption information and the plurality of features values for each residence in the collection of residences. At least one expected consumption value and at least one efficient consumption value can be determined based on the regression model.

In one example, the disclosed technology can be used to compare a particular home or residence (e.g., house, apartment, etc.) with another "similar" home included in the collection of residences and/or represented by the regression model described above. The other similar home can be a virtual representation or exemplification of a home that is considered to be similar to the particular home, in that the particular home and the other similar home have the same or similar feature values (e.g., age, area, number of occupants, etc.). In this example, the disclosed technology can know or have determined an energy consumption value (e.g., in kWh) for the other similar home, such as based on the regression model. This energy consumption value can be considered to be an amount of energy consumed by an average or typical home similar to the particular home. The disclosed technology can use this other similar home's energy consumption value to serve as a prediction for the amount of energy consumed by the particular home. Accordingly, this other similar home's consumption value can be considered an expected or "average" consumption value predicted for the particular home. Moreover, based on this expected or average consumption value for the particular home, an efficient consumption value can be calculated or determined for the particular home. In some cases, the expected and efficient consumption values can be presented to a resident of the particular home, such that the resident can evaluate how much energy is being consumed by the particular home and how the particular home's energy consumption compares to other similar homes. It is further contemplated that many variations are possible.

FIG. 1 illustrates an example system 100 including an example regression-based consumption determination module 102 configured to facilitate regression-based determination of expected energy consumption and efficient energy consumption, in accordance with an embodiment of the present disclosure. As shown in the example system 100 of FIG. 1, the regression-based consumption determination module 102 can include a feature module 104, a regression module 106, and a consumption value determination module 108. In some instances, the example system 100 can also include at least one data source 110.

In some embodiments, the regression-based consumption determination module 102 can be implemented, in part or in whole, using software, hardware, or any combination thereof. In general, a module can be associated with software, hardware, or any combination thereof. In some implementations, one or more functions, tasks, and/or operations of modules can be carried out or performed by software routines, software processes, hardware components, and/or any combination thereof. In some cases, the regression-based consumption determination module 102 can be implemented as software running on one or more computing devices or systems. In one example, the regression-based consumption determination module 102 can be implemented within an application (e.g., app) on a computing device or system, such as a smartphone, tablet, laptop, or desktop computer of a user. In some embodiments, the regression-based consumption determination module 102 can be implemented by or with an energy management platform. The energy platform may provide the functionality of the regression-based consumption determination module 102 as a service or through software. The regression-based consumption determination module 102 can be implemented within a proprietary program used by an energy provider, such as a utility company. In some instances, the regression-based consumption determination module 102 can be implemented with a network resource, such as a website or webpage. It is contemplated that many variations are possible.

The feature module 104 can be configured to facilitate identifying a set of features associated with at least one of a collection of residences or an energy billing period. In general, features can provide or correspond to properties, characteristics, traits, and/or other information about residences and/or energy billing periods. In some embodiments, the feature module 104 can utilize machine-assisted approaches (e.g., machine learning) and/or manual effort to identify which features about homes, as well as which features about energy billing periods, are useful for regression-based determination of expected energy consumption and efficient energy consumption.

In some implementations, the feature module 104 can facilitate the identifying of the set of features associated with at least one of the collection of residences or the energy billing period by identifying a first subset of features and a second subset of features from the set of features. The first subset of features can describe, characterize, or otherwise be associated with the collection of residences. Similarly, the second subset of features can describe, characterize, or otherwise be associated with the energy billing period.

In some instances, the first subset of features can include, but is not limited to, at least one of a residence age feature, a residence location feature, a residence area metric feature, a room quantity feature, a building type feature, a cooling system feature, a water heating feature, a space heating feature, an occupancy quantity feature, an appliance quantity feature, or a living situation feature. A feature value for the residence age feature for a particular residence can indicate how old the residence is. In one example, the feature value for the residence age feature of the residence can correspond to a year that the residence was built. A feature value for the residence location feature can, for example, correspond to an address, locational coordinates, or other geolocation information indicating where the residence is located and/or also can represent proximity(ies) of residents to each other. In another example, a feature value for the residence area metric feature can indicate an area size of the residence, such as a square footage (and/or in square meters) of the residence. In a further example, a feature value for the room quantity feature can indicate a number of rooms of the residence.

Moreover, a feature value for the building type feature can indicate, for example, what type of building the residence is (e.g., a single-family home, a large apartment, a small apartment, a mobile home, etc.). A feature value for the cooling system feature can indicate, for example, whether the residence has air conditioning, whether the residence is a window unit, or whether there is an absence of a cooling system at the residence. In another example, a feature value for the water heating feature can indicate whether water heating for the residence utilizes electricity, natural gas, or whether another or miscellaneous type of water heating is utilized at the residence. A feature value for the space heating feature can, for example, indicate whether space heating for the residence utilizes electricity, natural gas, fuel oil, or whether space heating is absent at the residence. A feature value for the occupancy quantity feature can, for example, indicate a number of people living at the residence. In another example, a feature value for the appliance quantity feature can indicate what and/or how many appliances (e.g., refrigerators) are at the residence. In a further example, the living situation feature can describe or indicate the living situation for the residence. In this example, a feature value for the living situation feature can indicate whether the residence is owned or rented by its resident(s). It is contemplated that there can be many variations and other possibilities.

Additionally, in some cases, the second subset of features can include at least one of a heating degree days (HDD) feature, a cooling degree days (CDD) feature, or a feature that indicates an energy billing period portion. A feature value for the HDD feature can indicate an average HDD for a particular residence during a particular duration of time (e.g., an energy billing period). A feature value for the CDD feature can indicate an average CDD for the particular residence during the particular duration of time. A feature value for the feature that indicates the energy billing period portion can indicate, for example, a fraction or portion of the energy billing period in each of the twelve months of a year.

Moreover, the feature module 104 can also be configured to facilitate acquiring (e.g., obtaining, determining, receiving, etc.), for each residence in the collection of residences, measured energy consumption information and a plurality of feature values. In some implementations, the measured energy consumption information and the plurality of feature values can be acquired from the at least one data source 110. Each feature value in the plurality of feature values can correspond to a respective feature in the set of features. In some cases, the collection of residences can include one or more residences for which information, including the plurality of feature values, is available. For example, the feature module 104 can acquire information only for those residences (i.e., the collection of residences) whose information has been made available or provided by the at least one data source 110, such as an energy provider (e.g., a utility company) and/or its customer(s).

In some cases, the feature module 104 can facilitate the acquiring of the measured energy consumption information and the plurality of feature values by acquiring a measured consumption value for each residence, acquiring a first group of feature values for each residence, and acquiring a second group of feature values for the energy billing period. The measured consumption value for each residence can correspond to an actual amount of energy consumed by each residence, which can be represented or indicated by a respective reading provided by a respective energy meter at each residence. Also, the first group of feature values and the second group of feature values can be included in the plurality of feature values acquired, obtained, determined, and/or received, etc., by the feature module 104. Each feature value in the first group of feature values can correspond to a respective feature in the first subset of features. Each feature value in the second group of feature values can correspond to a respective feature in the second subset of features. Some examples of features in the first subset and features in the second subset are described above. Many variations are possible.

In addition, the regression module 106 can be configured to facilitate training a regression model based on the measured energy consumption information and the plurality of features values for each residence in the collection of residences. Furthermore, the consumption value determination module 108 can be configured to facilitate determining, based on the regression model, at least one expected consumption value and at least one efficient consumption value.

In one example, the regression-based consumption determination module 102 can receive a request to determine energy consumption values for a query residence. In this example, an energy provider (e.g., a utility company) or a user or customer of the energy provider can make and transmit the request to determine the energy consumption values for a particular residence of interest, the query residence. The query residence can be associated with the user or customer. In this example, the user or customer can be residing at the query residence.

Continuing with the previous example, the feature module 104 can acquire at least some feature values for the query residence. The consumption value determination module 108 can facilitate the determining of the at least one expected consumption value by determining an expected consumption value for the query residence based on the regression model trained by the regression module 106 and based on the at least some feature values for the query residence. Also, the consumption value determination module 108 can facilitate the determining of the at least one efficient consumption value by determining an efficient consumption value for the query residence based on the expected consumption value for the query residence. The regression module 106 will be discussed in more detail below with reference to FIG. 2. More details regarding the consumption value determination module 108 will be provided below with reference to FIG. 3.

In some embodiments, the expected consumption value and the efficient consumption value for the query residence can be presented to an entity that is associated with the request, such as the energy provider and/or the customer residing at the query residence. Further, in some instances, a measured consumption value for the query residence can be presented to the entity that is associated with the request. The measured consumption value can correspond to an actual amount of energy consumed or used at the customer's residence (i.e., the query residence), such as an amount indicated by an energy meter reading at the customer's residence. In this example, the presenting of the expected consumption value, the efficient consumption value, and the measured consumption value for the customer's residence may enable the customer to better evaluate his or her energy consumption and usage. The presented values can enable the customer to better make decisions and/or exert effort to achieve his or her energy consumption goals. Again, many variations are possible.

Figure 2:
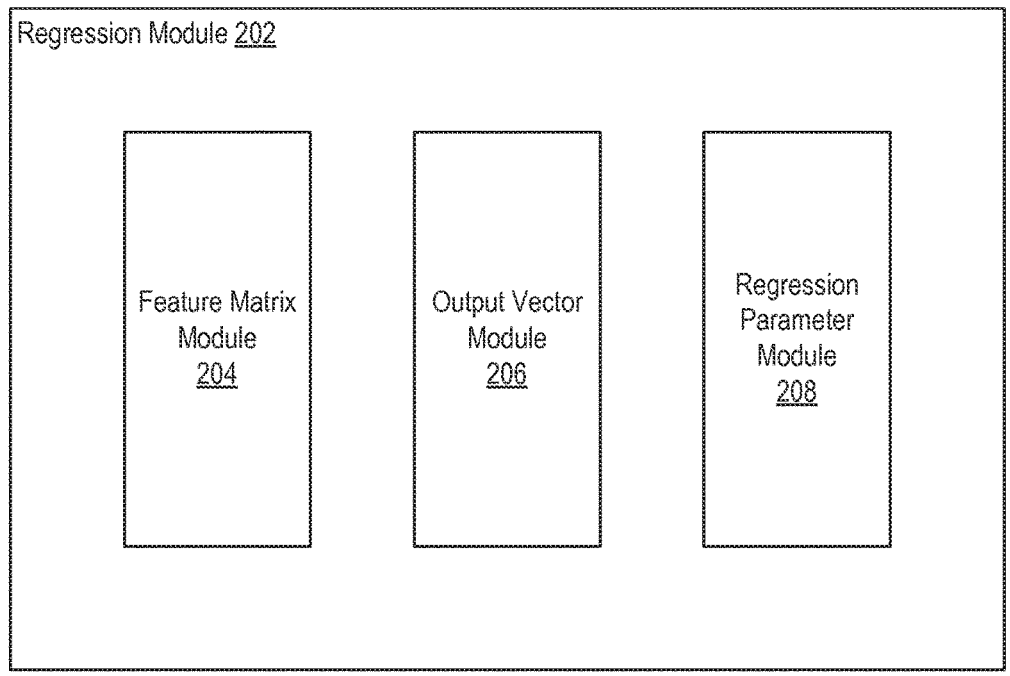
FIG. 2 illustrates an example regression module configured to facilitate regression-based determination of expected energy consumption and efficient energy consumption, in accordance with an embodiment of the present disclosure.

FIG. 2 illustrates an example regression module 202 configured to facilitate regression-based determination of expected energy consumption and efficient energy consumption, in accordance with an embodiment of the present disclosure. In some embodiments, the regression module 106 of FIG. 1 can be implemented as the example regression module 202. As shown in FIG. 2, the example regression module 202 can include a feature matrix module 204, an output vector module 206, and a regression parameter module 208.

As discussed above, the regression module 202 can be configured to facilitate training a regression model based on the measured energy consumption information and the plurality of features values for each residence in the collection of residences. In some cases, the training of the regression model can be based on determining, calculating, and/or approximating a set of one or more parameters for the regression model, which can be represented, stored, and included in a parameter vector for the regression model.

In some embodiments, the feature matrix module 204 can be configured to facilitate inputting the plurality of feature values for each residence into a feature matrix. For example, the feature matrix module 204 can input (e.g., place, store, etc.) the plurality of feature values for each residence into a respective row, out of a set of rows, within the feature matrix. The output vector module 206 can be configured to facilitate inputting the measured energy consumption information for each residence into an output vector. For example, the output vector module 206 can input the measured energy consumption information for each residence into a respective row, out of the set of rows, within the output vector. Accordingly, each residence can be associated with a respective row out of the set of rows. The plurality of feature values for a particular residence is inputted by the feature matrix module 204 into the feature matrix at a particular row, while the measured energy consumption information for the particular residence is inputted by the output vector module 206 into the output vector at the same particular row.

Further, the regression parameter module 208 can be configured to facilitate determining, based on the feature matrix and the output vector, the one or more parameters within the parameter vector for the regression model. Accordingly, in some cases, the training of the regression model can include the inputting of the plurality of feature values into the feature matrix by the feature matrix module 204, the inputting of the measured energy consumption information into the output vector by the output vector module 206, and the determining of the one or more parameters for the regression model by the regression parameter module 208.

In some implementations, the feature matrix can be represented (e.g., denoted, symbolized, signified, etc.) by X, the output vector can be represented by y, and the parameter vector can be represented by $\theta$. The regression model can be trained or developed based on $y = X\theta$. The product of the feature matrix X and the parameter vector $\theta$ can be equal to the output vector y. Accordingly, it follows that, in at least some cases, the determining of the one or more parameters within the parameter vector can be based on $\theta = (X^T X)^{-1} X^T y$. More details regarding the regression model will be provided below with reference to FIG. 4A and FIG. 4B.

Figure 3:
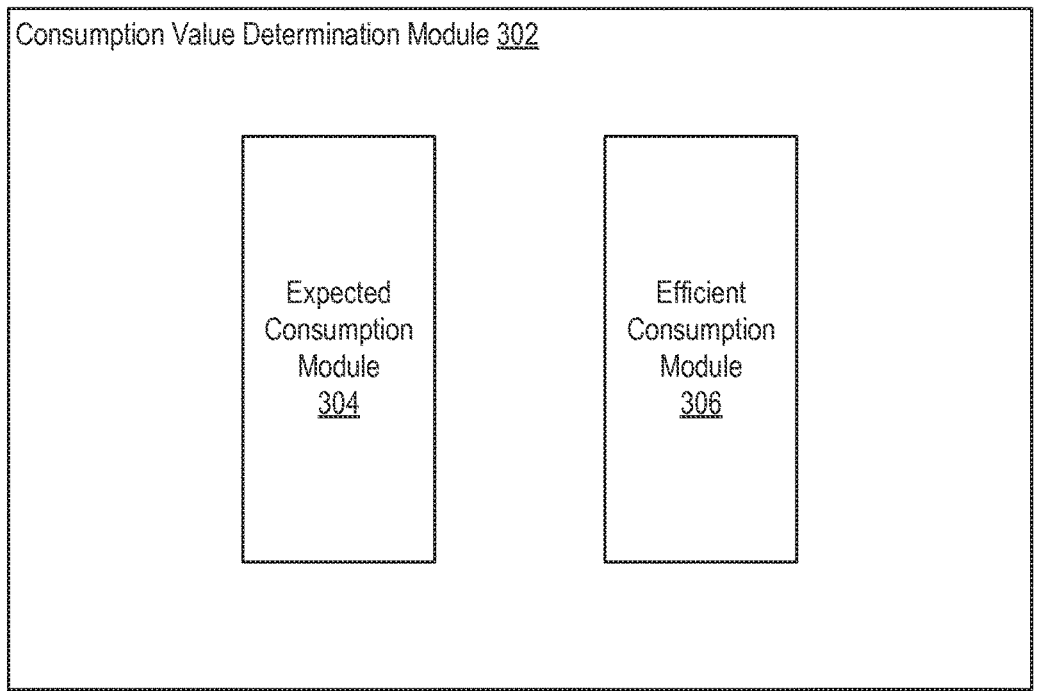
FIG. 3 illustrates an example consumption value determination module configured to facilitate regression-based determination of expected energy consumption and efficient energy consumption, in accordance with an embodiment of the present disclosure.

FIG. 3 illustrates an example consumption value determination module 302 configured to facilitate regression-based determination of expected energy consumption and efficient energy consumption, in accordance with an embodiment of the present disclosure. In some embodiments, the consumption value determination module 108 of FIG. 1 can be implemented as the example consumption value determination module 302. As shown in FIG. 3, the example consumption value determination module 302 can include an expected consumption module 304 and an efficient consumption module 306.

As discussed previously, the consumption value determination module 302 can be configured to facilitate determining, based on the regression model, at least one expected consumption value and at least one efficient consumption value. In some embodiments, the consumption value determination module 302 can utilize the expected consumption module 304 to determine the at least one expected consumption value based on the regression model and can utilize the efficient consumption module 306 to determine the at least one efficient consumption value.

Moreover, as discussed above, the regression model can be trained or developed based on $y = X\theta$, where y can represent (e.g., denote, symbolize, signify, etc.) the output vector, X can represented the feature matrix, and $\theta$ can represent the parameter vector. Accordingly, the product of the feature matrix X and the parameter vector $\theta$ can be equal to the output vector y. This equation can provide a basis for training and developing the regression model.

In some implementations, the expected consumption module 304 can be configured to facilitate determining an expected consumption value (or "average" consumption value, as explained above) for a query residence. In one example, the expected consumption value for the query residence can be determined (e.g., calculated, estimated, approximated, etc.) by the expected consumption module 304 based on $y_{exp\ i} \approx \theta^T x_i$. In this example, $y_{exp\ i}$ can represent the expected or average consumption value for the query residence as compared to a "similar" residence (as explained previously). In this example, $x_i$ can represent a feature vector including at least some feature values for the query residence. The at least some feature values can be provided by and acquired from the energy provider, a customer, and/or another entity associated with the query residence. It follows that the expected consumption module 304 can multiply a transpose of the parameter vector ($\theta^T$) for the trained regression model with the feature vector $x_i$ including the at least some feature values for the query residence. The resulting product is the query residence's expected consumption value, which can correspond to a scalar value indicating an estimated or predicted amount of energy that would be expected to be consumed or used by one or more residences similar to, or having the same or similar feature values as, the query residence.

Additionally, in some embodiments, the efficient consumption module 306 can be configured to facilitate determining an efficient consumption value for the query residence. In one example, the efficient consumption value for the query residence can be determined (e.g., calculated, estimated, approximated, etc.) by the efficient consumption module 306 based on $y_{\mathit{eff}\,i} = y_{exp\,i} - S.E.$, where $y_{\mathit{eff}\,i}$ represents the efficient consumption value for the query residence and S. E. represents a standard error. The efficient consumption value for the query residence provides an estimation or approximation of an energy consumption value that should be achievable or attainable by the query residence. The efficient consumption value can illustrate an estimated or predicted amount of energy that is being used by one or more residences that are similar to the query residence and using energy efficiently. In some instances, the query residence's energy consumption (e.g., measured consumption value) can already be equal to or lower than the efficient consumption value. In some cases, however, if the query residence's energy consumption is higher than the efficient consumption value, the disclosed technology can suggest how to reduce the query residence's energy consumption.

Further, in some instances, the standard error S. E. can be determined by the efficient consumption module 306 based on $$S.E. = \sqrt{\frac{(y - x\theta)^2}{N - m}},$$

where N represents a quantity of rows in the set of rows within the feature matrix (or a quantity of residences in the collection of residences) and where m represents a number of features. It should be appreciated that there can be many variations and other possibilities.

FIG. 4A illustrates an example representation 400 of data associated with regression-based determination of expected energy consumption and efficient energy consumption, in accordance with an embodiment of the present disclosure. The example representation 400 illustrates a feature matrix X 410, an output vector y 420, and a parameter vector θ 430. It should be understood that the example representation 400 is provided for illustrative purposes and may not necessarily provide actual feature values, actual consumption values, etc.

Again, as described above, the plurality of feature values as well as the measured consumption for each residence can be provided by and/or acquired from one or more data sources, such as an energy provider (e.g., a utility company) and/or its customers (e.g., users, residents, etc.). Each row in the feature matrix X 410 can store the plurality of feature values for a particular residence in the collection of residences during a particular billing period. Moreover, a corresponding row in the output vector y 420 can store the measured consumption for the particular residence during the particular billing period.

As discussed previously, the product of the feature matrix X 410 and the parameter vector θ 430 can be equal to the output vector y 420. Moreover, the determining of the one or more parameters (e.g., $\theta_1$ through $\theta_k$) in the parameter vector θ 430 can be associated with the training of the regression model. Using the information in the feature matrix X 410 and in the output vector y 420, the one or more parameters for the regression model can be determined or estimated. For example, the parameters within the parameter vector θ 430 can be determined based on $\theta = (X^T X)^{-1} X^T y$. As such, the regression model can be trained and developed. It follows that expected and efficient consumption values can be determined or approximated for a query residence based on the regression model.

FIG. 4B illustrates an example representation 450 of data associated with regression-based determination of expected energy consumption, in accordance with an embodiment of the present disclosure. The example representation 450 illustrates a transpose $\theta^T$ 460 of the parameter vector θ (e.g., vector 430 in FIG. 4A), a feature vector $x_i$ 470 including at least some feature values for a query residence i, and an expected or average consumption value $y_{exp\,i}$ 480 for the query residence. Again, it should be appreciated that the example representation 450 is provided for illustrative purposes and may not necessarily provide actual feature values, actual consumption values, etc.

In some embodiments, the expected consumption value $y_{exp\,i}$ 480 for the query residence can be determined or estimated based on $y_{exp\,i} \approx \theta^T x_i$. As shown in the example representation 450, a quantity of features as well as a quantity of regression parameters (e.g., $\theta_1$ through $\theta_k$) can both be k, such that the product of the transpose $\theta^T$ 460 of the parameter vector θ and the feature vector $x_i$ 470 for the query residence can result in a scalar value, the expected consumption value $y_{exp\,i}$ 480 for the query residence. The expected consumption value $y_{exp\,i}$ 480 for the query residence can indicate, approximate, or predict an amount of energy that is expected to be consumed or used by one or more residences similar to, or having the same or similar feature values as, the query residence. Again, many variations are possible.

Figure 5:
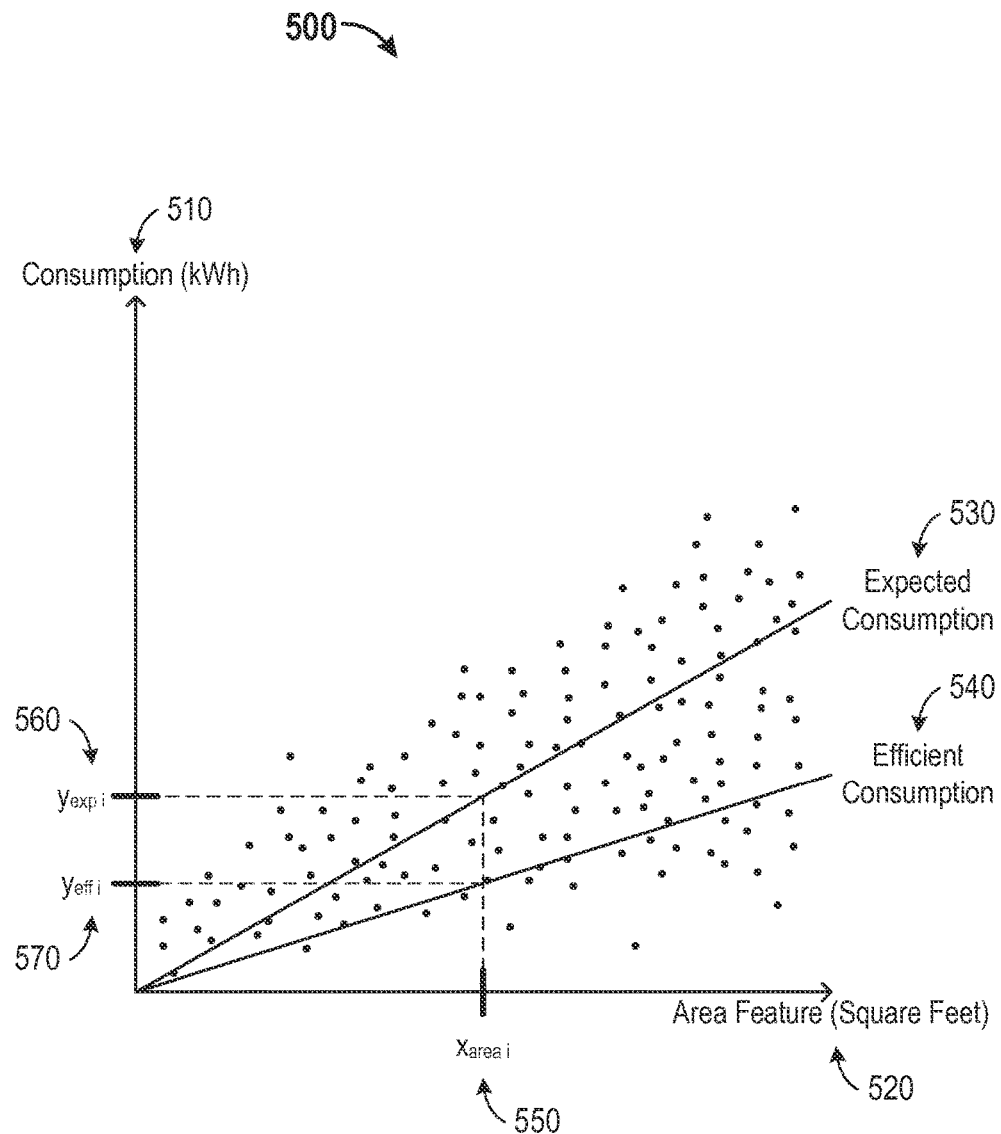
FIG. 5 illustrates an example graph representation associated with regression-based determination of expected energy consumption and efficient energy consumption, in accordance with an embodiment of the present disclosure.

FIG. 5 illustrates an example graph representation 500 associated with regression-based determination of expected energy consumption and efficient energy consumption, in accordance with an embodiment of the present disclosure. The example graph representation 500 illustrates data points that represent residences in the collection of residences. In this example, the data points are plotted with respect to a particular feature (area feature 520) associated with the data points as well as with respect to the consumption values 510 associated with the data points. It should be understood that the example graph representation 500 is provided for illustrative purposes, may not necessarily be drawn to scale, and may not necessarily provide actual feature values, actual consumption values, etc. Moreover, it should be appreciated that there can be many additional features, which can be plotted in additional dimensions. In one example, there can be k features such that data points representing residences can be plotted with respect to their consumption values as well as with respect to each of the k features in k dimensions. Many variations are possible.

As shown in the example representation 500, expected consumption can be determined or estimated based on a trained regression model. For example, expected consumption 530 can be determined or estimated based on a linear regression model trained using the data points associated with the residences. Also, efficient consumption 540 can be determined based on the expected consumption 530. In some instances, the efficient consumption 540 can be determined by subtracting a standard error S. E. from the expected consumption 530 (e.g., $y_{\mathit{eff}} = y_{exp} - S.E.$).

In one example, a feature value, such as an area feature value $x_{area\,i}$ 550, for a particular feature (area feature 520) can be acquired for a query residence i. Based on the linear regression model and the area feature value $x_{area\,i}$ 550, an expected or average consumption value $y_{exp\,i}$ 560 can be determined for the query residence. Moreover, based on the expected or average consumption value $y_{exp\,i}$ 560 for the query residence, an efficient consumption value $y_{\mathit{eff}\,i}$ 570 can also be determined for the query residence. Again, this can be expanded to include additional features, such as a total of 30 different features. It is also contemplated that the disclosed technology can utilize any suitable number (e.g., k) of features.

Figure 6:
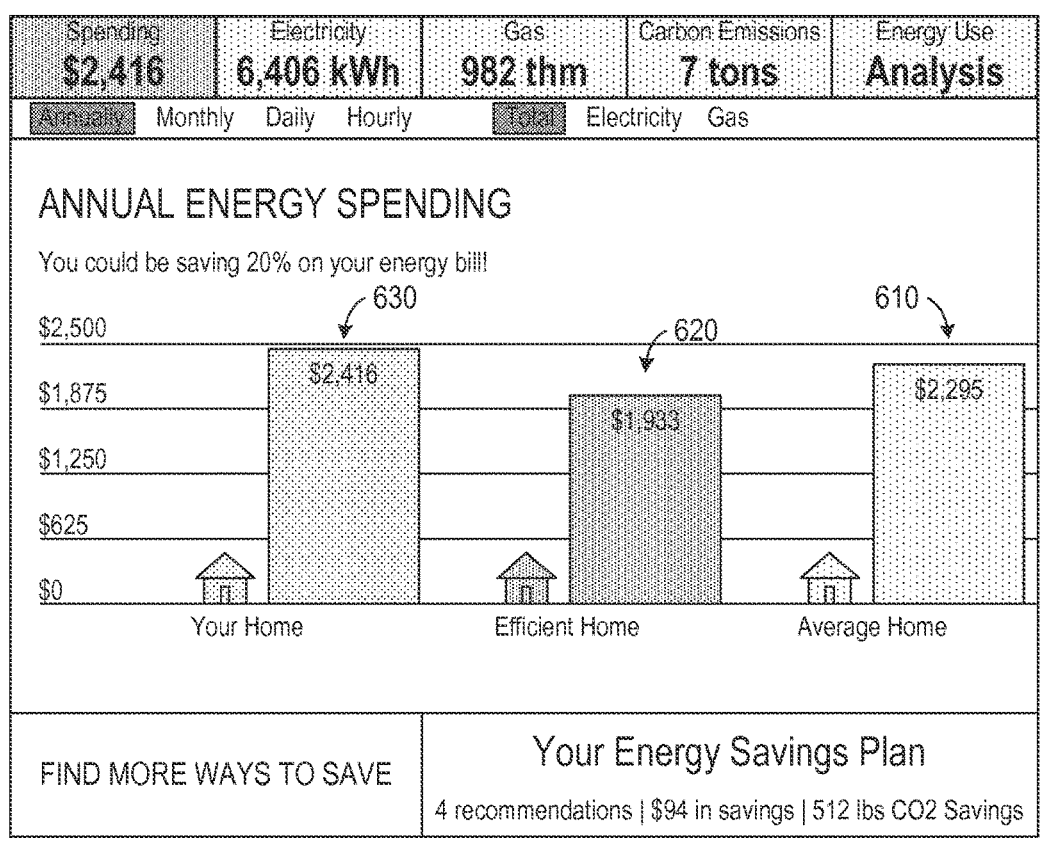
FIG. 6 illustrates an example presentation interface associated with regression-based determination of expected energy consumption and efficient energy consumption, in accordance with an embodiment of the present disclosure.

FIG. 6 illustrates an example presentation interface 600 associated with regression-based determination of expected energy consumption and efficient energy consumption, in accordance with an embodiment of the present disclosure. The example presentation interface 600 can be provided or otherwise utilized by various embodiments of the disclosed technology. In one example, the presentation interface 600 can be presented to and/or used by an energy provider or its customer(s). In some cases, the presentation interface 600 can be presented to and/or used by a resident of a query residence.

In the example of FIG. 6, a request to determine energy consumption values for a query residence can be received. The presentation interface 600 can be configured to present, to an entity (e.g., utility company, user, customer, resident, etc.) that is associated with the request, the expected or average consumption value 610 for the query residence and the efficient consumption value 620 for the query residence. Moreover, the presentation interface 600 can present, to the entity that is associated with the request, a measured consumption value 630 for the query residence. Again, it should be understood that there can be many variations and other possibilities.

For example, in some embodiments, the presentation interface 600 can also provide one or more recommendations and/or suggestions 640 to save energy (and money). In some implementations, the consumption values (e.g., measured, expected, efficient, etc.) can be annualized to indicate energy consumption per year. In some embodiments, the consumption values can be normalized or otherwise modified to indicate energy consumption per hour, day, week, month, etc. Also, in some implementations, the energy consumption values can be associated with electricity, gas, or a combination thereof.

Figure 7A:
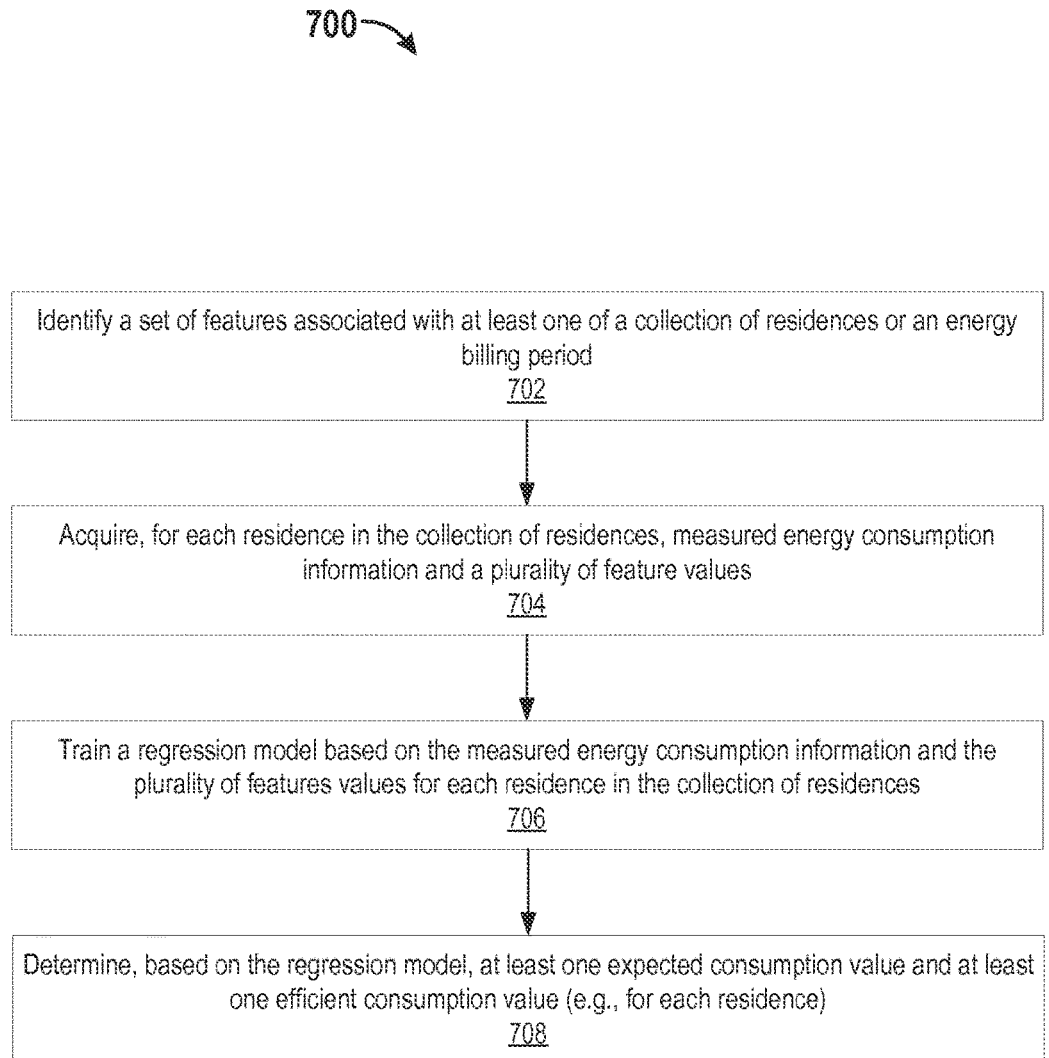
FIG. 7A illustrates an example method associated with regression-based determination of expected energy consumption and efficient energy consumption, in accordance with an embodiment of the present disclosure.

FIG. 7A illustrates an example method 700 associated with regression-based determination of expected energy consumption and efficient energy consumption, in accordance with an embodiment of the present disclosure. It should be understood that there can be additional, fewer, or alternative steps performed in similar or alternative orders, or in parallel, within the scope of the various embodiments unless otherwise stated.

At block 702, the example method 700 can identify a set of features associated with at least one of a collection of residences or an energy billing period. At block 704, the example method 700 can acquire, for each residence in the collection of residences, measured energy consumption information and a plurality of feature values. Each feature value in the plurality of feature values can correspond to a respective feature in the set of features. At block 706, the example method 700 can train a regression model based on the measured energy consumption information and the plurality of features values for each residence in the collection of residences. At block 708, the example method 700 can determine, based on the regression model, at least one expected consumption value and at least one efficient consumption value.

Figure 7B:
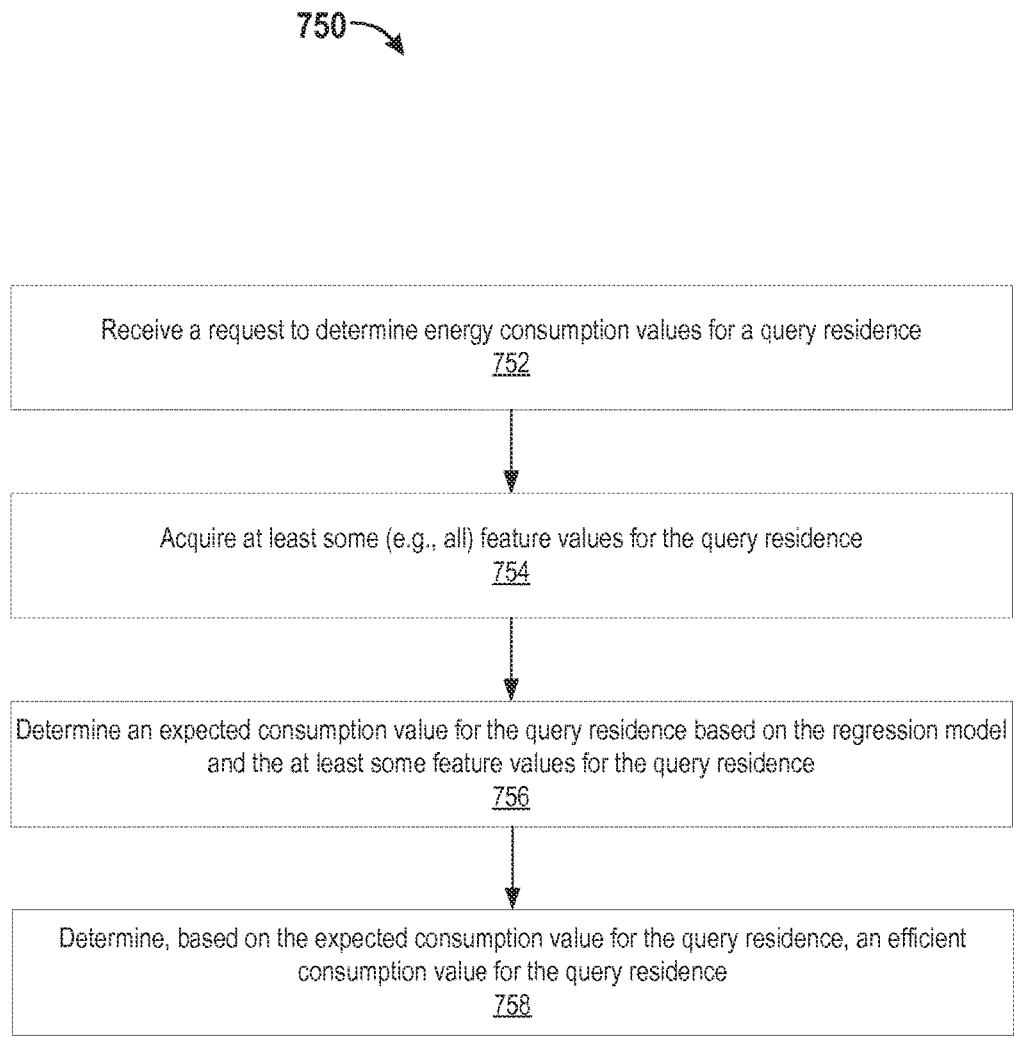
FIG. 7B illustrates an example method associated with regression-based determination of expected energy consumption and efficient energy consumption, in accordance with an embodiment of the present disclosure.

FIG. 7B illustrates an example method 750 associated with regression-based determination of expected energy consumption and efficient energy consumption, in accordance with an embodiment of the present disclosure. Again, it should be appreciated that there can be additional, fewer, or alternative steps performed in similar or alternative orders, or in parallel, within the scope of the various embodiments unless otherwise stated.

At block 752, the example method 750 can receive a request to determine energy consumption values for a query residence. At block 754, the example method 750 can acquire at least some (e.g., all) feature values for the query residence. At block 756, the example method 750 can determine an expected consumption value for the query residence based on the regression model and the at least some feature values for the query residence. At block 758, the example method 750 can determine, based on the expected consumption value for the query residence, an efficient consumption value for the query residence.

It is further contemplated that there can be many other uses, applications, and/or variations associated with the various embodiments of the present disclosure. For example, in some embodiments, at least some of the plurality of features values can be acquired based on one or more Bayesian inference processes or other similar processes. Furthermore, as discussed above, the example regression-based consumption determination module 102 of FIG. 1 can be implemented, in part or in whole, as software, hardware, or any combination thereof. In some embodiments, the regression-based consumption determination module 102 can be implemented with an energy management platform, such as the energy management platform 802 of FIG. 8 and/or the energy management platform 902 of FIG. 9. Again, it is contemplated that there can be many variations and other possibilities.

Example Energy Management Platform

Figure 8:
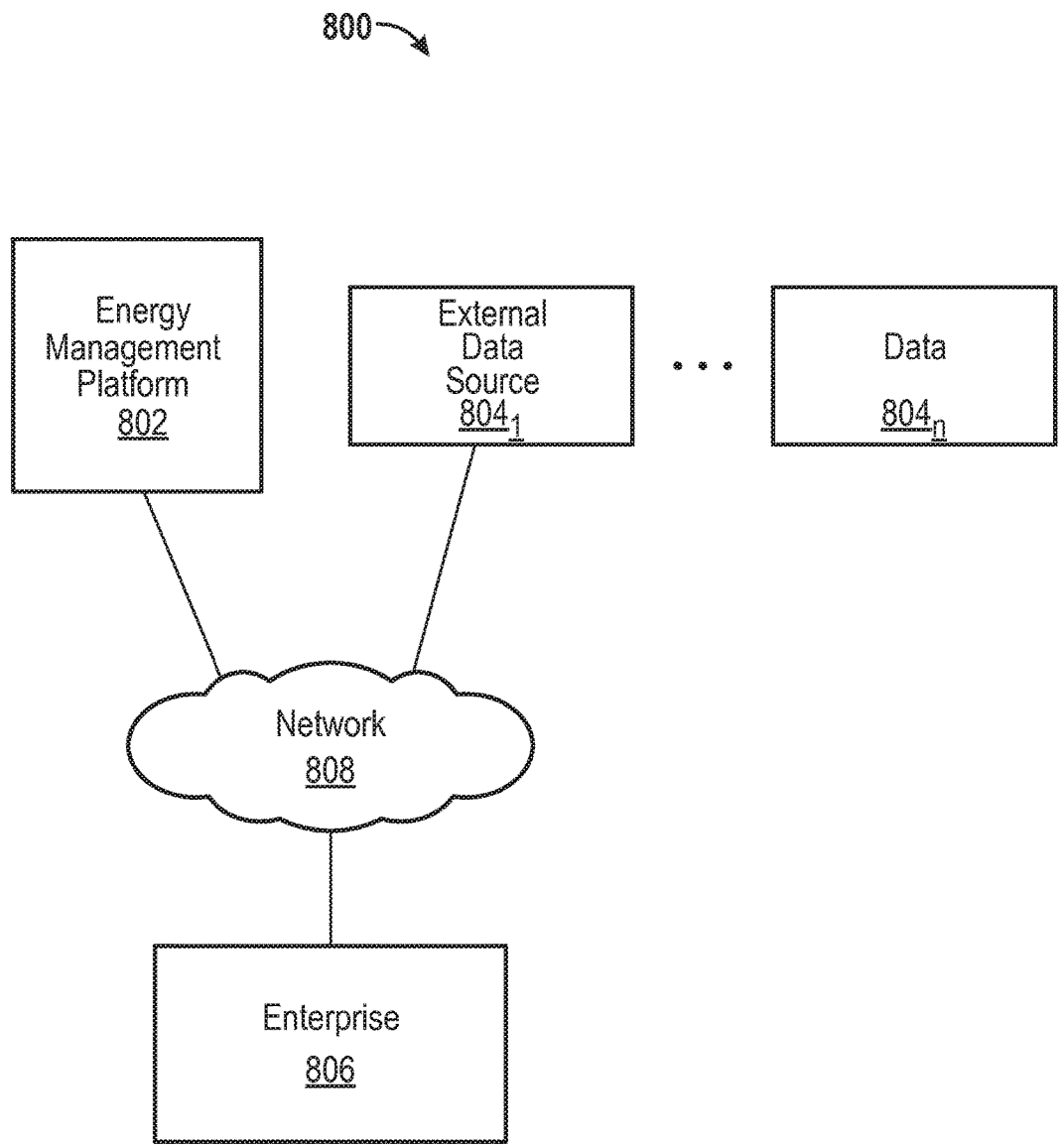
FIG. 8 illustrates an example environment for energy management, in accordance with an embodiment of the present disclosure.

FIG. 8 illustrates an example environment 800 for energy management, in accordance with an embodiment of the present disclosure. The environment 800 includes an energy management platform 802, external data sources 8041-n, an enterprise 806, and a network 808. The energy management platform 802 can provide functionality to allow the enterprise 806 to track, analyze, and optimize energy usage of the enterprise 806. The energy management platform 802 may constitute an analytics platform. The analytics platform may handle data management, multi-layered analysis, and data visualization capabilities for all applications of the energy management platform 802. The analytics platform may be specifically designed to process and analyze significant volumes of frequently updated data while maintaining high performance levels.

The energy management platform 802 may communicate with the enterprise 806 through user interfaces (UIs) presented by the energy management platform 802 for the enterprise 806. The UIs may provide information to the enterprise 806 and receive information from the enterprise 806. The energy management platform 802 may communicate with the external data sources 8041-n through APIs and other communication interfaces. Communications involving the energy management platform 802, the external data sources 8041-n, and the enterprise 806 are discussed in more detail herein.

The energy management platform 802 may be implemented as a computer system, such as a server or series of servers and other hardware (e.g., applications servers, analytic computational servers, database servers, data integrator servers, network infrastructure (e.g., firewalls, routers, communication nodes)). The servers may be arranged as a server farm or cluster. Embodiments of the present disclosure may be implemented on the server side, on the client side, or a combination of both. For example, embodiments of the present disclosure may be implemented by one or more servers of the energy management platform 802. As another example, embodiments of the present disclosure may be implemented by a combination of servers of the energy management platform 802 and a computer system of the enterprise 806.

The external data sources 8041-n may represent a multitude of possible sources of data relevant to energy management analysis. The external data sources 8041-n may include, for example, grid and utility operational systems, meter data management (MDM) systems, customer information systems (CIS), billing systems, utility customer systems, utility enterprise systems, utility energy conservation measures, and rebate databases. The external data sources 8041-n also may include, for example, building characteristic systems, weather data sources, third-party property management systems, and industry-standard benchmark databases.

The enterprise 806 may represent a user (e.g., customer) of the energy management platform 802. The enterprise 806 may include any private or public concern, such as large companies, small and medium businesses, households, individuals, governing bodies, government agencies, non-governmental organizations, nonprofits, etc. The enterprise 806 may include energy providers and suppliers (e.g., utilities), energy service companies (ESCOs), and energy consumers. The enterprise 806 may be associated with one or many facilities distributed over many geographic locations. The enterprise 806 may be associated with any purpose, industry, or other type of profile.

The network 808 may use standard communications technologies and protocols. Thus, the network 808 may include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 808 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 808 may be represented using technologies and/or formats including hypertext markup language (HTML) and extensible markup language (XML). In addition, all or some links may be encrypted using conventional encryption technologies such as secure sockets layer (SSL), transport layer security (TLS), and Internet Protocol security (IPsec).

In an embodiment, each of the energy management platform 802, the external data sources 8041-n, and the enterprise 806 may be implemented as a computer system (or device). The computer system (or device) may include one or more machines, each of which may be implemented as machine 1100 of FIG. 11, which is described in further detail herein.

Figure 9:
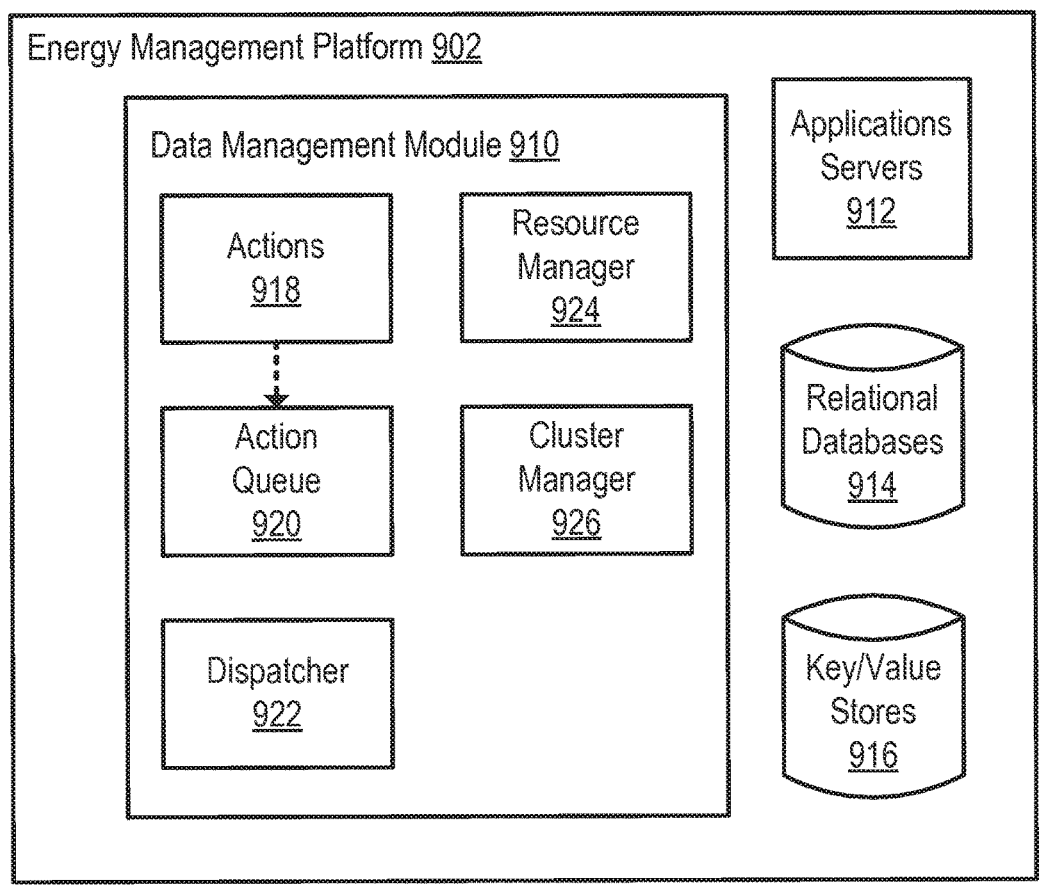
FIG. 9 illustrates an example energy management platform, in accordance with an embodiment of the present disclosure.

FIG. 9 illustrates an example energy management platform 902, in accordance with an embodiment of the present disclosure. In some embodiments, the example energy management platform 902 can be implemented as the energy management platform 802 of FIG. 8. In an embodiment, the energy management platform 902 may include a data management module 910, applications servers 912, relational databases 914, and key/value stores 916. In some embodiments, the energy management platform 902 can also include a regression-based consumption determination module (e.g., the regression-based consumption determination module 102 of FIG. 1).

The data management module 910 may support the capability to automatically and dynamically scale a network of computing resources for the energy management platform 902 according to demand on the energy management platform 902. The dynamic scaling supported by the data management module 910 may include the capability to provision additional computing resources (or nodes) to accommodate increasing computing demand. Likewise, the data management module 910 may include the capability to release computing resources to accommodate decreasing computing demand. The data management module 910 may include one or more action(s) 918, a queue 920, a dispatcher 922, a resource manager 924, and a cluster manager 926.

The actions 918 may represent the tasks that are to be performed in response to requests that are provided to the energy management platform 902. Each of the actions 918 may represent a unit of work to be performed by the applications servers 912. The actions 918 may be associated with data types and bound to engines (or modules). The requests may relate to any task supported by the energy management platform 902. For example, the request may relate to, for example, analytic processing, loading energy-related data, retrieving an energy star reading, retrieving benchmark data, etc. The actions 918 are provided to the action queue 920.

The action queue 920 may receive each of the actions 918. The action queue 920 may be a distributed task queue and represents work that is to be routed to an appropriate computing resource and then performed.

The dispatcher 922 may associate and hand-off a queued action to an engine that will execute the action. The dispatcher 922 may control routing of each queued action to a particular one of the applications servers 912 based on load balancing and other optimization considerations. The dispatcher 922 may receive an instruction from the resource manager 924 to provision new nodes when the current computing resources are at or above a threshold capacity. The dispatcher 922 also may receive an instruction from the resource manager to release nodes when the current computing resources are at or below a threshold capacity. The dispatcher 922 accordingly may instruct the cluster manager 926 to dynamically provision new nodes or release existing nodes based on demand for computing resources. The nodes may be computing nodes or storage nodes in connection with the applications servers 912, the relational databases 914, and the key/value stores 916.

The resource manager 924 may monitor the action queue 920. The resource manager 924 also may monitor the current load on the applications servers 912 to determine the availability of resources to execute the queued actions. Based on the monitoring, the resource manager may communicate, through the dispatcher 922, with the cluster manager 926 to request dynamic allocation and de-allocation of nodes.

The cluster manager 926 may be a distributed entity that manages all of the nodes of the applications servers 912. The cluster manager 926 may dynamically provision new nodes or release existing nodes based on demand for computing resources. The cluster manager 926 may implement a group membership services protocol. The cluster manager 926 also may perform a task monitoring function. The task monitoring function may involve tracking resource usage, such as CPU utilization, the amount of data read/written, storage size, etc.

The applications servers 912 may perform processes that manage or host analytic server execution, data requests, etc. The engines provided by the energy management platform 902, such as the engines that perform data services, batch processing, stream services, may be hosted within the applications servers 912. The engines are discussed in more detail herein.

In an embodiment, the applications servers 912 may be part of a computer cluster of a plurality of loosely or tightly connected computers that are coordinated to work as a system in performing the services and applications of the energy management platform 902. The nodes (e.g., servers) of the cluster may be connected to each other through fast local area networks ("LAN"), with each node running its own instance of an operating system. The applications servers 912 may be implemented as a computer cluster to improve performance and availability over that of a single computer, while typically being more cost-effective than single computers of comparable speed or availability. The applications servers 912 may be software, hardware, or a combination of both.

The relational databases 914 may maintain various data supporting the energy management platform 902. In an embodiment, non-time series data may be stored in the relational databases 914, as discussed in more detail herein.

The key/value stores 916 may maintain various data supporting the energy management platform 902. In an embodiment, time series data (e.g., meter readings, meter events, etc.) may be stored in the key/value store, as discussed in more detail herein. In an embodiment, the key/value stores 916 may be implemented with Apache Cassandra, an open source distributed database management system designed to handle large amounts of data across a multitude of commodity servers. In an embodiment, other database management systems for key/value stores may be used.

In an embodiment, one or more of the applications servers 912, the relational databases 914, and the key/value stores 916 may be implemented by the entity that owns, maintains, or controls the energy management platform 902.

In an embodiment, one or more of the applications servers 912, the relational databases 914, and the key/value stores 916 may be implemented by a third party that may provide a computing environment for lease to the entity that owns, maintains, or controls the energy management platform 902. In an embodiment, the applications servers 912, the relational databases 914, and the key/value stores 916 implemented by the third party may communicate with the energy management platform 902 through a network, such as the network 808 of FIG. 8.

The computing environment provided by the third party for the entity that owns, maintains, or controls the energy management platform 902 may be a cloud computing platform that allows the entity that owns, maintains, or controls the energy management platform 902 to rent virtual computers on which to run its own computer applications. Such applications may include, for example, the applications performed by the applications servers 912, as discussed in more detail herein. In an embodiment, the computing environment may allow a scalable deployment of applications by providing a web service through which the entity that owns, maintains, or controls the energy management platform 902 can boot a virtual appliance used to create a virtual machine containing any software desired. In an embodiment, the entity that owns, maintains, or controls the energy management platform 902 may create, launch, and terminate server instances as needed, paying based on time usage time, data usage, or any combination of these or other factors. The ability to provision and release computing resources in this manner supports the ability of the energy management platform 902 to dynamically scale according to the demand on the energy management platform 902.

Figure 10:
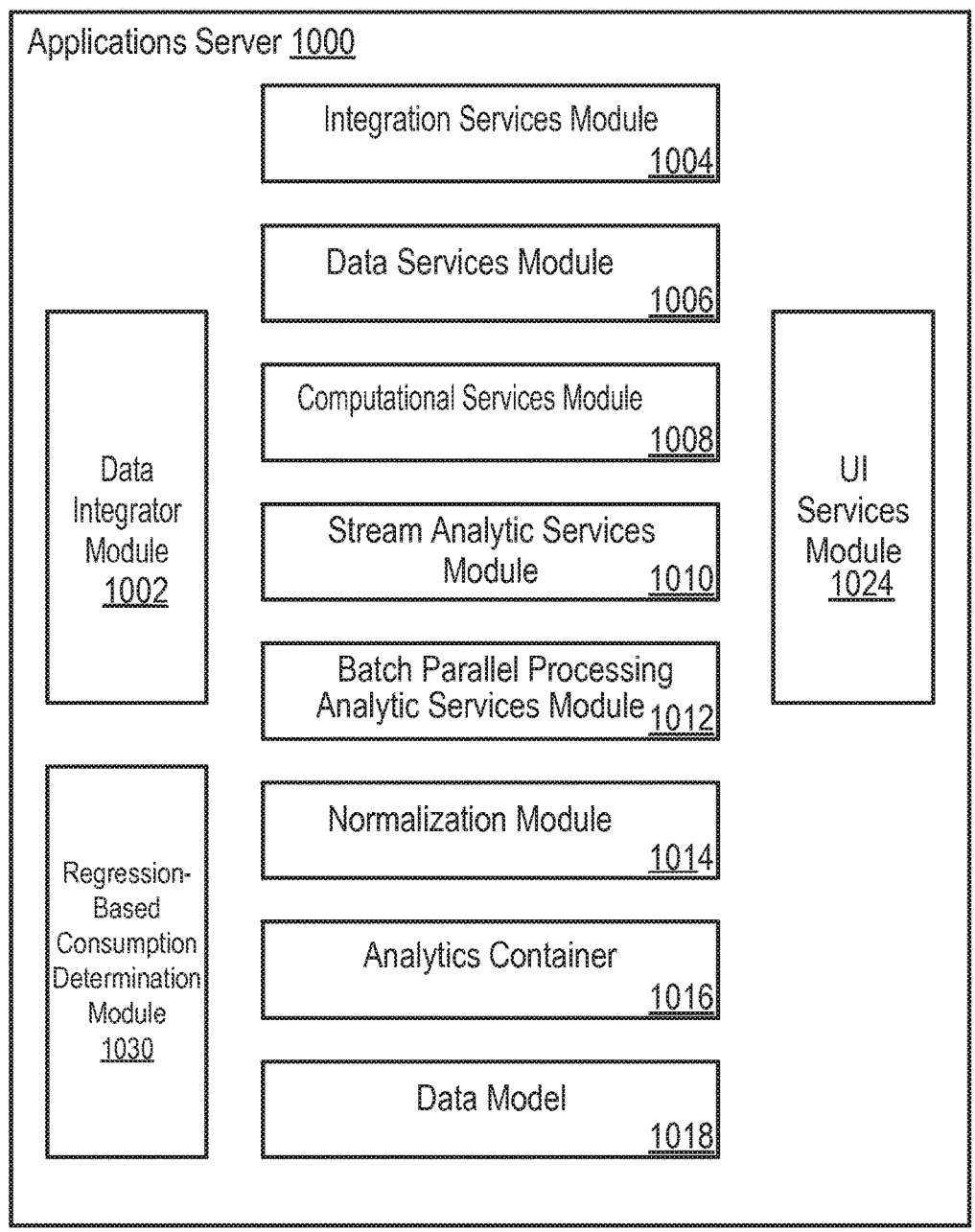
FIG. 10 illustrates an example applications server of an energy management platform, in accordance with an embodiment of the present disclosure.

FIG. 10 illustrates an example applications server 1000 of an energy management platform, in accordance with an embodiment of the present disclosure. In an embodiment, one or more of the applications servers 912 of FIG. 9 may be implemented with applications server 1000 of FIG. 10. The applications server 1000 includes a data integrator (data loading) module 1002, an integration services module 1004, a data services module 1006, a computational services module 1008, a stream analytic services module 1010, a batch parallel processing analytic services module 1012, a normalization module 1014, an analytics container 1016, a data model 1018, and a user interface (UI) services module 1024. In some embodiments, the applications server 1000 can also include a regression-based consumption determination module 1030. In some cases, the regression-based consumption determination module 1030 can be implemented as the regression-based consumption determination module 102 of FIG. 1.

For example, the regression-based consumption determination module 1030 can be configured to facilitate identifying a set of features associated with at least one of a collection of residences or an energy billing period. The regression-based consumption determination module 1030 can also be configured to facilitate acquiring, for each residence in the collection of residences, measured energy consumption information and a plurality of feature values. Each feature value in the plurality of feature values can correspond to a respective feature in the set of features. Moreover, the regression-based consumption determination module 1030 can be configured to facilitate training a regression model based on the measured energy consumption information and the plurality of features values for each residence in the collection of residences. The regression-based consumption determination module 1030 can further be configured to facilitate determining, based on the regression model, at least one expected consumption value and at least one efficient consumption value. Other features of the regression-based consumption determination module 1030 are discussed herein in connection with the regression-based consumption determination module 102 of FIG. 1.

In some embodiments, the analytics platform supported by the applications server 1000 includes multiple services that each handles a specific data management or analysis capability. The services include the data integrator module 1002, the integration services module 1004, the data services module 1006, the computational services module 1008, the stream analytic services module 1010, batch parallel processing analytic services module 1012, and the UI services module 1024. All or some services within the analytics platform may be modular and accordingly architected specifically to execute their respective capabilities for large data volumes and at high speed. The services may be optimized in software for high performance distributed computing over a computer cluster including the applications servers 912.

The modules and components of the applications server 1000 in FIG. 10 and all the figures herein are merely exemplary, and may be variously combined into fewer modules and components, or separated into additional modules and components. The described functionality of the modules and components may be performed by other modules and components.

Example Machine

Figure 11:
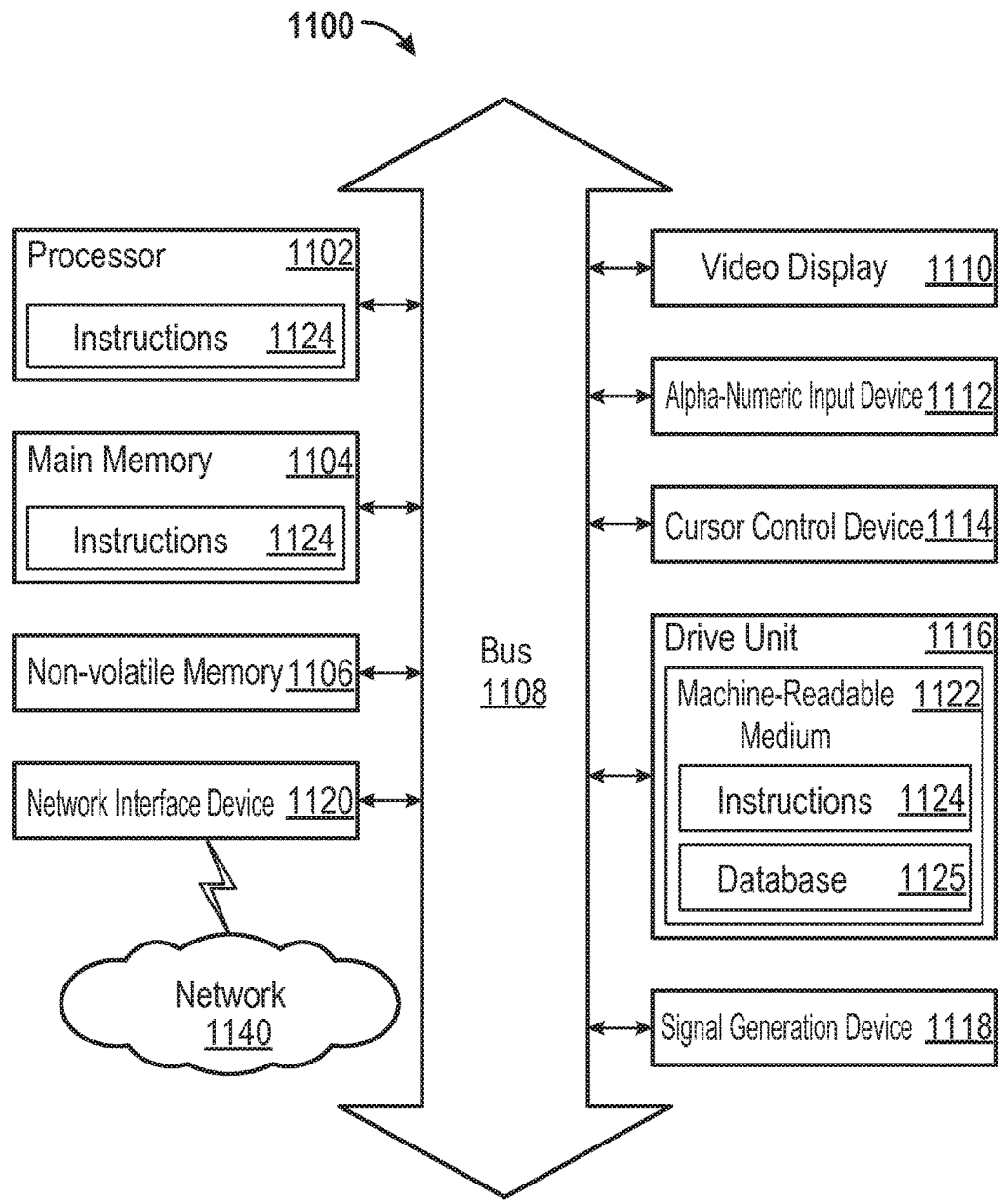
FIG. 11 illustrates an example machine within which a set of instructions for causing the machine to perform one or more of the embodiments described herein can be executed, in accordance with an embodiment of the present disclosure.

FIG. 11 illustrates an example machine 1100 within which a set of instructions for causing the machine to perform one or more of the embodiments described herein can be executed, in accordance with an embodiment of the present disclosure. The machine may be connected (e.g., networked) to other machines. In a networked deployment, the machine may operate in the capacity of a server or a client machine in a client-server network environment, or as a peer machine in a peer-to-peer (or distributed) network environment.

The machine 1100 includes a processor 1102 (e.g., a central processing unit (CPU), a graphics processing unit (GPU), or both), a main memory 1104, and a nonvolatile memory 1106 (e.g., volatile RAM and non-volatile RAM), which communicate with each other via a bus 1108. In some cases, the example machine 1100 can correspond to, include, or be included within a computing device or system. For example, in some embodiments, the machine 1100 can be a desktop computer, a laptop computer, personal digital assistant (PDA), an appliance, a wearable device, a camera, a tablet, or a mobile phone, etc. In one embodiment, the machine 1100 also includes a video display 1110, an alphanumeric input device 1112 (e.g., a keyboard), a cursor control device 1114 (e.g., a mouse), a drive unit 1116, a signal generation device 1118 (e.g., a speaker) and a network interface device 1120.

In one embodiment, the video display 1110 includes a touch sensitive screen for user input. In one embodiment, the touch sensitive screen is used instead of a keyboard and mouse. The disk drive unit 1116 includes a machine-readable medium 1122 on which is stored one or more sets of instructions 1124 (e.g., software) embodying any one or more of the methodologies or functions described herein. The instructions 1124 can also reside, completely or at least partially, within the main memory 1104 and/or within the processor 1102 during execution thereof by the computer system 1100. The instructions 1124 can further be transmitted or received over a network 1140 via the network interface device 1120. In some embodiments, the machine-readable medium 1122 also includes a database 1125.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, the routines executed to implement the embodiments of the present disclosure can be implemented as part of an operating system or a specific application, component, program, object, module or sequence of instructions referred to as "programs" or "applications". For example, one or more programs or applications can be used to execute specific processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the present disclosure. Such changes are also implicitly included in the description. They still fall within the scope of the present disclosure. It should be understood that this disclosure is intended to yield a patent covering numerous aspects of the disclosed technology, both independently and as an overall system, and in both method and apparatus modes.

Further, each of the various elements of the present disclosure and claims may also be achieved in a variety of manners. This disclosure should be understood to encompass each such variation, be it a variation of an embodiment of any apparatus embodiment, a method or process embodiment, or even merely a variation of any element of these.

What is claimed is:

1. A system for determining a plurality of energy consumption metrics to aid an entity or a user in improving energy management, the system comprising:
    a server in communication with a plurality of data sources; and
    a memory comprising instructions stored thereon that, when executed by the server, perform operations comprising:
        identifying a set of selected features associated with a collection of residences, wherein the set of selected features is identified based on its potential impact(s) on the energy consumption of the residences and comprises (1) a plurality of physical characteristics associated with the residences, and (2) residential information about occupants and their living situation, wherein the set of selected features comprises at least a residence age feature, a residence location feature, a residence area metric, and a cooling system feature;
        acquiring, from a plurality of data sources for each residence in the collection of residences, (i) measured energy consumption information for at least electricity or gas, and (ii) a plurality of feature values for the set of selected features wherein each feature value of said plurality is a discrete measure corresponding to a selected feature from the set of selected features, wherein the plurality of data sources comprise grid and utility operation systems, meter data management systems, customer information systems, billing systems, and utility customer systems;
        developing and training a regression-based energy consumption predictive model by providing (i) the measured energy consumption information and (ii) the plurality of feature values for the collection of residences into the regression-based energy consumption predictive model, including determining parameters for each of the selected features; and
        determining using the regression-based energy consumption predictive model, the plurality of energy consumption metrics comprising at least one expected consumption value and at least one efficient consumption value for a residence of interest, that are usable to aid the entity or the user in improving the energy management of the residence of interest, including multiplying feature values for the residence of interest by the determined parameters for each of the selected features.

2. The system of claim 1, wherein the plurality of energy consumption metrics for the residence of interest is determined by comparing the residence of interest to a virtual comparative residence within the regression-based energy consumption predictive model.

3. The system of claim 1, wherein the regression-based energy consumption predictive model is configured to determine the plurality of energy consumption metrics for a variety of different residences of interest having different physical characteristics or residential information.

4. The system of claim 1, wherein the system is configured to receive a query from the entity or the user to determine the plurality of energy consumption metrics for the residence of interest.

5. The system of claim 4, wherein the query comprises at least one feature value for at least one selected feature associated with the residence of interest.

6. The system of claim 5, wherein the query comprises two or more feature values for at least two or more corresponding selected features associated with the residence of interest.

7. The system of claim 1, wherein the set of selected features further comprises one or more of the following: a room quantity feature, a building type feature a water heating feature, a space heating feature, an occupancy quantity feature, an appliance quantity feature, or a living situation feature.

8. The system of claim 7, wherein the plurality of physical characteristics associated with the residences comprises one or more of the following: the residence age feature, the residence location feature, the residence area metric feature, the room quantity feature, the building type feature, the cooling system feature, the water heating feature, or the space heating feature.

9. The system of claim 7, wherein the residential information about the occupants and their living situation comprises at least one of the occupancy quantity feature or the living situation feature.

10. The system of claim 7, wherein a feature value for the residence age feature of a selected residence is indicative of an age of the selected residence.

11. The system of claim 7, wherein a feature value for the residence location feature of a selected residence comprises an address, locational coordinates or geolocation information indicative of a physical location of the selected residence.

12. The system of claim 7, wherein a feature value for the residence location feature of a selected residence comprises a proximity of the selected residence to other residences in the collection of residences.

13. The system of claim 7, wherein a feature value for the residence area metric feature of a selected residence comprises a size or area of the selected residence.

14. The system of claim 7, wherein a feature value for the room quantity feature of a selected residence comprises a number of rooms in the selected residence.

15. The system of claim 7, wherein a feature value for the building type feature of a selected residence comprises a building type of the selected residence.

16. The system of claim 7, wherein (a) a feature value for the cooling system feature of a selected residence comprises a presence, absence and/or type of cooling system in the selected residence; (b) a feature value for the space heating feature of the selected residence comprises a presence, absence and/or type of heating system in the selected residence; and (c) a feature value for the water heating feature of the selected residence comprises a type of water heating system in the selected residence.

17. The system of claim 7, wherein a feature value of the living situation feature of a selected residence comprises information about a living situation, rental or ownership of the selected residence.

18. The system of claim 7, wherein a feature value of the occupancy quantity feature of a selected residence comprises a number of occupants living in the selected residence.

19. The system of claim 1, wherein the entity comprises an energy utility company, and the user comprises a customer of the energy utility company residing at the residence of interest.

20. The system of claim 5, wherein the at least one expected consumption value for the residence of interest is determined based on the at least one feature value.

21. The system of claim 20, wherein the at least one efficient consumption value for the residence of interest is determined based on the at least one expected consumption value.

22. The system of claim 1, wherein the regression-based energy consumption predictive model is developed and trained by determining or approximating one or more regression parameters for the predictive model.

23. The system of claim 22, wherein the regression-based energy consumption predictive model is developed and trained by providing (i) the measured energy consumption information as an output vector and (ii) the plurality of feature values for the collection of residences as an input feature matrix into the regression-based energy consumption predictive model.

24. The system of claim 4, wherein a parameter vector comprising the one or more regression parameters is determined based on the input feature matrix and the output vector.

25. The system of claim 1, wherein the operations further comprise:
obtaining an actual energy consumption value of the residence of interest, and
determining whether the actual energy consumption value is higher than the at least one efficient consumption value.

26. The system of claim 25, wherein the operations further comprise:
providing recommendations to the user for reducing energy consumption of the residence of interest when the actual energy consumption value is determined to be higher than the at least one efficient consumption value.

27. The system of claim 5, wherein at least some of the plurality of feature values for the set of selected features are acquired based on one or more Bayesian inference processes.

28. The system of claim 1, wherein the plurality of data sources further comprises one or more of the following: utility enterprise systems, utility energy conservation measures, rebate databases, building characteristic systems, weather data sources, third-party property management systems, or industry-standard benchmark databases.

29. The system of claim 1, wherein the server is in communication with the plurality of data sources through a plurality of Application Programming Interfaces (APIs) or communication interfaces.

30. A computer-implemented method for determining a plurality of energy consumption metrics to aid an entity or a user in improving energy management, the method comprising:
identifying a set of selected features associated with a collection of residences, wherein the set of selected features is identified based on its potential impact(s) on the energy consumption of the residences and comprises (1) a plurality of physical characteristics associated with the residences, and (2) residential information about occupants and their living situation, wherein the set of selected features comprises at least a residence age feature, a residence location feature, a residence area metric, and a cooling system feature;
acquiring, from a plurality of data sources for each residence in the collection of residences, (i) measured energy consumption information for at least electricity or gas, and (ii) a plurality of feature values for the set of selected features wherein each feature value of said plurality is a discrete measure corresponding to a selected feature from the set of selected features, wherein the plurality of data sources comprise grid and utility operation systems, meter data management systems, customer information systems, billing systems, and utility customer systems;
developing and training a regression-based energy consumption predictive model by providing (i) the measured energy consumption information and (ii) the plurality of feature values for the collection of residences into the regression-based energy consumption predictive model, including determining parameters for each of the selected features; and
determining using the regression-based energy consumption predictive model, the plurality of energy consumption metrics comprising at least one expected consumption value and at least one efficient consumption value for a residence of interest, that are usable to aid the entity or the user in improving the energy management of the residence of interest, including multiplying feature values for the residence of interest by the determined parameters for each of the selected features.

31. A non-transitory computer-readable storage medium comprising instructions that, when executed by a server, causes the server to perform a method for determining a plurality of energy consumption metrics to aid an entity or a user in improving energy management, the method comprising:

identifying a set of selected features associated with a collection of residences, wherein the set of selected features is identified based on its potential impact(s) on the energy consumption of the residences and comprises (1) a plurality of physical characteristics associated with the residences, and (2) residential information about occupants and their living situation, wherein the set of selected features comprises at least a residence age feature, a residence location feature, a residence area metric, and a cooling system feature;

acquiring, from a plurality of data sources for each residence in the collection of residences, (i) measured energy consumption information for at least electricity or gas, and (ii) a plurality of feature values for the set of selected features wherein each feature value of said plurality is a discrete measure corresponding to a selected feature from the set of selected features, wherein the plurality of data sources comprise grid and utility operation systems, meter data management systems, customer information systems, billing systems, and utility customer systems;

developing and training a regression-based energy consumption predictive model by providing (i) the measured energy consumption information and (ii) the plurality of feature values for the collection of residences into the regression-based energy consumption predictive model, including determining parameters for each of the selected features; and determining using the regression-based energy consumption predictive model, the plurality of energy consumption metrics comprising at least one expected consumption value and at least one efficient consumption value for a residence of interest, that are usable to aid the entity or the user in improving the energy management of the residence of interest, including multiplying feature values for the residence of interest by the determined parameters for each of the selected features.

* * * * *